United States Patent
Boehmer et al.

(10) Patent No.: US 10,439,402 B2
(45) Date of Patent: Oct. 8, 2019

(54) CONSTANT POWER ADAPTIVE POWER SYSTEM

(71) Applicant: The Johns Hopkins University, Baltimore, MD (US)

(72) Inventors: Tyler J. Boehmer, Columbia, MD (US); Deanna K. Temkin, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 97 days.

(21) Appl. No.: 15/840,085

(22) Filed: Dec. 13, 2017

(65) Prior Publication Data

US 2018/0233925 A1    Aug. 16, 2018

Related U.S. Application Data

(60) Provisional application No. 62/458,612, filed on Feb. 14, 2017.

(51) Int. Cl.

| | |
|---|---|
| *H02J 5/00* | (2016.01) |
| *H02J 7/34* | (2006.01) |
| *H02M 1/44* | (2007.01) |
| *H02M 3/335* | (2006.01) |
| *H02M 3/158* | (2006.01) |

(52) U.S. Cl.
CPC ............ *H02J 5/00* (2013.01); *H02J 7/345* (2013.01); *H02M 1/44* (2013.01); *H02M 3/158* (2013.01); *H02M 3/33584* (2013.01)

(58) Field of Classification Search
CPC .. H02J 5/00; H02J 7/345; H02M 1/44; H02M 3/158; H02M 3/33584

USPC .......................................................... 307/46
See application file for complete search history.

(56) References Cited

U.S. PATENT DOCUMENTS

| | | | |
|---|---|---|---|
| 6,255,744 B1 * | 7/2001 | Shih | ......................... G06F 1/30 307/64 |
| 6,278,279 B1 | 8/2001 | Daun-Lindberg et al. | |
| 6,304,059 B1 | 10/2001 | Chalasani et al. | |
| 6,459,173 B1 | 10/2002 | Gunsaulus et al. | |
| 7,567,060 B1 | 7/2009 | Atcitty et al. | |
| 8,179,698 B2 | 5/2012 | Jang et al. | |
| 8,878,505 B2 | 11/2014 | Temkin | |
| 9,041,354 B2 | 5/2015 | Lee | |

(Continued)

*Primary Examiner* — Carlos Amaya
(74) *Attorney, Agent, or Firm* — Noah J. Hayward

(57) ABSTRACT

An adaptive power system for powering a dynamically changing load may include an energy storage device, a bi-directional current source, and compensation circuitry. The bi-directional current source may be electrically connected between the energy storage device and a power distribution bus of a power distribution system. Further, the bi-directional current source is configured to receive a compensation value and, based on the compensation value, maintain a constant power level on the power distribution bus by delivering current to the power distribution bus from the energy storage device or absorbing current from the power distribution bus for storage in the energy storage device. The compensation circuitry may be configured to generate the compensation value. An expected average current value for the dynamically changing load and a power distribution bus current value may be used to generate the compensation value for maintaining the constant power level on the power distribution bus.

13 Claims, 7 Drawing Sheets

(56) References Cited

U.S. PATENT DOCUMENTS

| | | |
|---|---|---|
| 2001/0040410 A1 | 11/2001 | Akiba |
| 2005/0006958 A1 | 1/2005 | Dubovsky |
| 2005/0263331 A1* | 12/2005 | Sopko .................... B60K 6/46 |
| | | 180/65.1 |
| 2011/0291611 A1 | 12/2011 | Manor |
| 2017/0149369 A1 | 5/2017 | Watabu et al. |

* cited by examiner

CONSTANT POWER ADAPTIVE POWER SYSTEM

CROSS-REFERENCE TO RELATED APPLICATIONS

This application claims priority to and the benefit of prior-filed U.S. Provisional Application Ser. No. 62/458,612, filed Feb. 14, 2017, the content of which is herein incorporated by reference in its entirety.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Example embodiments generally relate to power systems and, in particular, relate to an adaptive power system for dynamic loads.

BACKGROUND

Dynamic loads, such as high-energy sensors or energy-based weapons, may be deployed on platforms including ships, planes, satellites, or the like. The dynamic loads may consume a large portion of the platform's electrical power resources and thereby cause extreme power transients. These extreme power transients may have dynamic load profiles, including both periodic predictable characteristics and aperiodic unpredictable characteristics. The dynamic load profiles may cause sudden changes in power requirements and thus currents at the platform's power distribution system. These sudden changes may stress platform systems, including generators, prime movers, and other loads sharing a common bus of the power distribution system. Duty cycles of the dynamic loads may vary from small to continuous and, for some cases, the peak power demands may be above the capability of the platform's power plant. These types of extreme dynamic load profiles may not be supported with conventional power distribution systems.

Conventional power distribution systems have focused heavily on providing well-regulated voltages and clean power to a corresponding load. Typically, the voltage dynamics of the load may be addressed by minimizing the output impedance of each converter stage by using small series inductance values, large shunt capacitance values, and/or control loops with high bandwidths. However, conventional power distribution systems may do little to prevent the mid to low frequency load dynamics from propagating back to the distribution bus and generator.

In an instance in which the dynamic load profiles propagate back to the platform's electric plant, significant power quality issues and generator/distribution losses may occur. Additionally, dynamic pulse loading of a dynamic load profile may cause wear and tear on mechanical parts of the generator. Torsional stresses to the shaft of the platform's prime mover may result due to very large and quickly changing electromagnetic load torques. The dynamic electromagnetic load torques may also excite the shaft's torsional resonances, e.g. sub-synchronous resonances, adding additional stresses to the shaft.

In some examples, a power distribution system may be buffered from dynamic load profiles by a brute force method, a throw away power method, or a restricted-timeline method. In an example power distribution system utilizing the brute-force method, passive filters may be used to smooth the dynamics of the dynamic load profile. Although the brute force method results in minimal additional power losses, achieving the smoothing, or filtering desired by the platform power system may require filter sizes and/or weights that are impractical or prohibitive for platform, such as a ship, installation.

In an example power distribution system utilizing the throw-away-power method, when the load is not using the maximum power allocated, the excess power is dissipated in an active load. This type of power distribution system may increase the reliability of the generator and minimize bus disturbances by maintaining a constant load profile to the generators. However, the active load may have severe impacts on power distribution system efficiency resulting from the large additional power dissipation, increasing both cooling requirements and fueling costs for the platform.

In an example power distribution system utilizing the restricted-timeline method, the power distribution system may include a predefined charging time for the power distribution system. Pulse power may only be supplied by the power distribution system to the load at predefined scheduled time intervals. For these power distribution systems, the successive power pulses, e.g. launch times or fire times (repetition rate) and corresponding system performance are limited by the charging times of the power distribution system. Some examples of such systems include the Electromagnetic Aircraft Launch System (EMALS) and rail guns.

BRIEF SUMMARY OF SOME EXAMPLES

According to some example embodiments, an adaptive power system for powering a dynamically changing load is provided. The adaptive power system may comprise a an energy storage device, a bi-directional current source, and compensation circuitry. The bi-directional current source may be configured to be electrically connected between the energy storage device and a power distribution bus of a power distribution system. The bi-directional current source may be further configured to receive a compensation value and, based on the compensation value, maintain a constant power level on the power distribution bus by delivering current to the power distribution bus from the energy storage device or absorbing current from the power distribution bus for storage in the energy storage device. The compensation circuitry may be configured to generate the compensation value. An expected average current value for the dynamically changing load and a power distribution bus current value may be used to generate the compensation value for maintaining the constant power level on the power distribution bus.

According to some example embodiments, another adaptive power system for powering a dynamically changing load may be provided. The adaptive power system may comprise an alternating current (AC) generator, an AC to direct current (DC) converter, an energy storage device, a bi-directional current source, and compensation circuitry. The AC to direct current (DC) converter may be coupled between the generator and the dynamically changing load. The bi-directional current source may be configured to be electrically connected between the energy storage device and a power distribution bus of a power distribution system. The bi-directional current source may be configured to receive a compensation value and, based on the compensation value, maintain a constant power level on the power distribution bus by delivering current to the power distribution bus from the energy storage device or absorbing current from the power distribution bus for storage in the energy storage device. The compensation circuitry may be configured to generate the compensation value. The expected average current value for the dynamically changing load and a power distribution bus current value may be used to generate the compensation value for maintaining the constant power level on the distribution bus.

According to some example embodiments, a method for powering a dynamically changing load is provided. The method may include generating a compensation value based on an expected average current value for the dynamically changing load and a power distribution bus current value, and maintaining a constant power level on the power distribution bus by controlling a bi-directional current source to deliver, based on a compensation value, current to the power distribution bus from an energy storage device or absorb, based on the compensation value, current from the power distribution bus for storage in the energy storage device.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
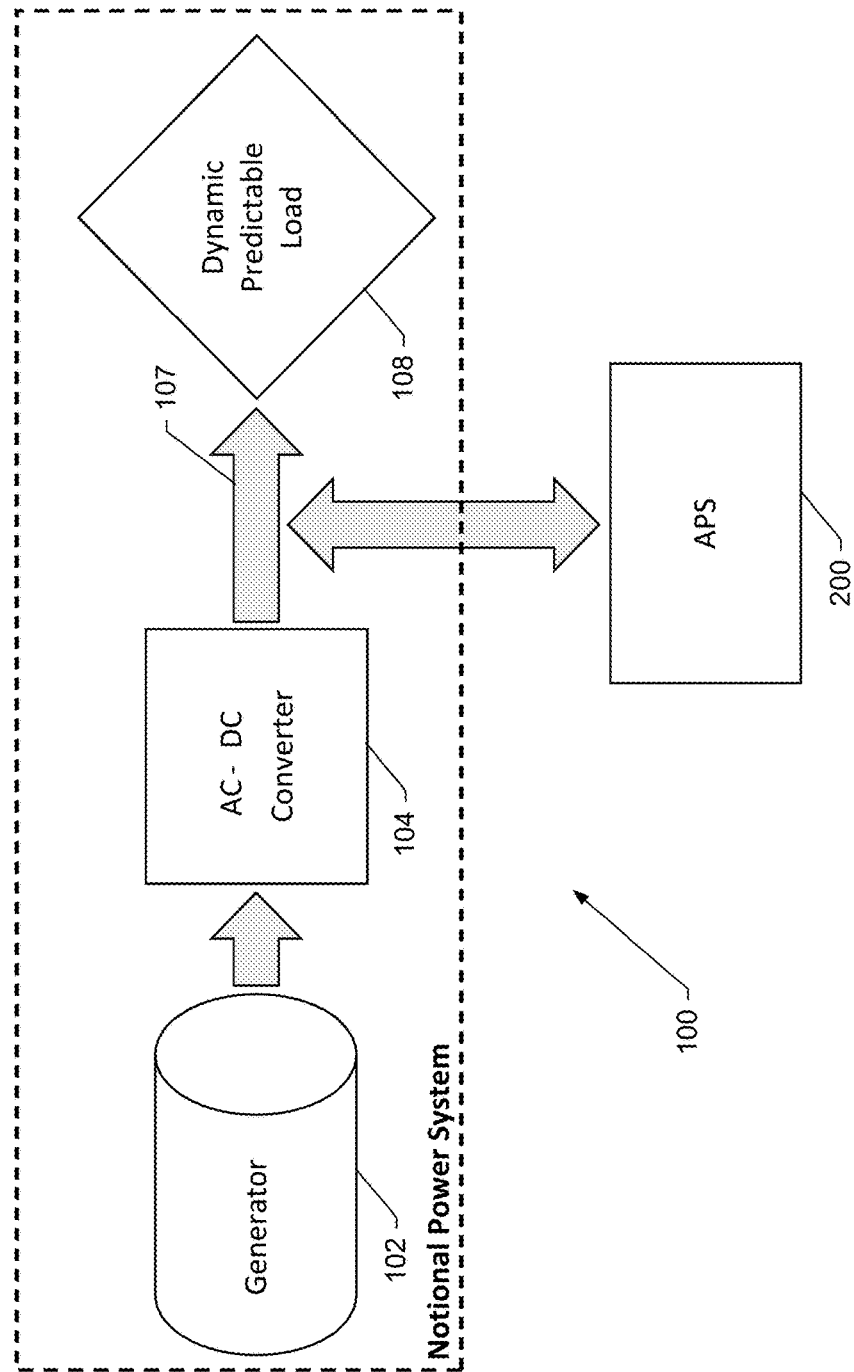
FIG. 1 illustrates an example notional power system with an adaptive power system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

According to some example embodiments, an adaptive power system is provided that operates to maintain a constant power level on a power distribution bus, despite the existence of a changing load (i.e., changing with respect to power demands). Dynamically changing loads may be associated with a variety of electrical devices that exhibit non-constant load profiles. Some devices that exhibit wide swings in load requirements include electromagnetic railguns, energy lasers, unmanned vehicles, and drilling rigs. However, while these loads may be dynamic, they may be also be repetitive and relatively predictable. As such, according to various example embodiments, the adaptive power system can exploit a dynamic, predictable load profile to compensate for the changes in the load. In the case of, for example, railguns and energy lasers, initiation of the use of the device may not be predictable, however, once use begins, these devices may exhibit a predictable, dynamic load in the form of, for example a repetitive change in load over the period of time when the device is being used.

To provide electric power to such loads, an example adaptive power system, according to some example embodiments, may be electrically coupled to a power distribution bus in shunt between the power distribution system source (e.g., generator) and the dynamic, predictable load. Further, the example adaptive power system may be configured to maintain a constant power level on the power distribution bus as the load changes. By maintaining a constant power level on the power distribution bus, an adaptive power system may mitigate bus disturbances and reduce stress on generators thereby avoiding problems that would occur if the power system was required to support the dynamic load without any compensation. Such a solution is particularly applicable on localized power systems or space-constrained platforms such as shipboard power systems.

The example adaptive power system may include a bi-directional current source that operates together with a power storage device (e.g., a storage capacitor) to maintain the constant power level by delivering current to the power distribution bus from the energy storage device or absorbing current from the power distribution bus for storage in the energy storage device, depending on the load. The bi-directional current source may be electrically coupled between the energy storage device and the distribution system bus. The bi-directional current source may be controlled by compensation circuitry configured to provide the bi-directional current source with a compensation value to control the operation of the bi-directional current source. The compensation value may be determined based on a variety of inputs. In this regard, an expected average current value may be calculated or otherwise determined and used to maintain voltage regulation of the energy storage device such that the net energy used from the energy storage device is approximately zero over a single period of the load profile. In this regard, the compensation value may be based on an expected average current value that would be an input into the adaptive power system based on the load profiles of the predictable, dynamically changing load. The expected average current value may be used as a desired upstream-current regulation set-point. Additionally, the compensation value may be determined based on a measurement of the bus current, the expected average current value, and an adjustment in the form of an energy compensation loop value, as provided by energy compensation loop circuitry. Further, a signal for generating the compensation value may be calculated by integrating the difference between the expected average current and the actual, instantaneous load current, multiplied by the bus voltage, to determine the expected energy use.

Such an adaptive power system may achieve the lowest possible peak power demand on the upstream power system, which can be a significant benefit relative to power-limited systems. The adaptive power system, according to some example embodiments, may support the dynamic load at a fraction of the size and weight needed when compared with, for example, a passive filter associated with the a brute-force, method; without excessive power dissipation as would exist if using an active load, such as in the throw-away, method; and for some applications without timeline restrictions as would be needed if using a refresh or recharging type system, such as with the restricted-timeline method.

As discussed above, the load profile of the dynamic loads may introduce substantial amounts of harmonic noise on the power distribution bus typically due to the extreme changes in load. In some example embodiments, the dynamic loads may not only produce noise at harmonic frequencies, but also large levels of noise at interharmonic (e.g., not multiples of 60 Hz on a 60 Hz system) and sub-harmonic (e.g., less than 60 Hz on a 60 Hz system) frequencies. The compensation circuitry, and more specifically, the energy compensation loop circuitry, described in further detail below, may enable the adaptive power system to reduce the rate at which the power demand on the generator changes, thus limiting the dynamics and spectral content on the bus and seen by the generator. According to some example embodiments, the adaptive power system may operate to eliminate nearly all power dynamics on an upstream power system. Limiting the dynamics and spectral content on the bus and seen by the generator may allow a dynamic load, such as a weapon or sensor system, to operate efficiently and within standard power quality parameters for a given power system.

FIG. 1 illustrates an example notional power system with an adaptive power system according to an example embodiment. In an example embodiment, a platform may include a notional power system 100. The notional power system 100 may include a generator 102, an alternating current (AC) to direct current (DC) converter 104, a DC bus 107, and a dynamic, predictable load 108. The generator 102 may be a steam turbine, gas turbine, jet turbine type generator, diesel generator, or other generator configured to supply power to the platform. The generator 102 may output 300 VAC, 450 VAC, 4160 VAC, or the like. The AC-DC converter 104 may be a solid state rectifier, such as a diode rectifier, a motor generator, or the like, configured to convert the AC power generated by the generator 102 to DC. In an example embodiment, the generator may output 450 VAC, which may be converted to 450 VDC or 375 VDC by the AC-DC converter 104 and output to the DC bus 107, which in turn supplies the dynamic, predictable load 108.

As discussed above the dynamic predictable load 108 may cause extreme variations to the dynamic load profiles on the DC bus 107. In an example embodiment, an adaptive power system 200 may be electrically connected to the DC bus 107 in shunt. The adaptive power system 200 may include a capacitor or capacitor bank and compensation circuitry, which may include energy compensation loop circuitry, and be configured to control a bi-directional current source. An expected average current value for the DC bus 107 may be utilized as an input for compensation to maintain a constant power on the DC bus 107. An EMI filter may be used to reduce switching noise associated with the bi-directional current source. The adaptive power system 200 may mitigate bus disturbances and reduce the stresses to the generator 102 by converting the dynamic, predictable power load on the notional power system 100 into constant power load. In an example embodiment, the energy stored in the capacitor may be regulated via the energy compensation loop circuitry, which, for example, slowly adjusts a reference current to maintain capacitor voltage within allowable boundaries.

In contrast to conventional power distribution system dynamic load compensation methods, which may utilize voltage regulation to keep the voltage of the capacitor within allowable bounds, the adaptive power system 200 may utilize energy regulation. Energy regulation by the adaptive power system 200 may linearize an energy compensation loop transfer function with respect to the bi-directional current source. The bi-directional current source may provide power complementary to the dynamic load profile from the adaptive power system 200 to the dynamic, predictable load 108 providing a buffer to upstream power equipment, e.g. generator 102. A more detailed discussion of the adaptive power system 200 is provided below with reference to FIG. 4.

Figure 2:
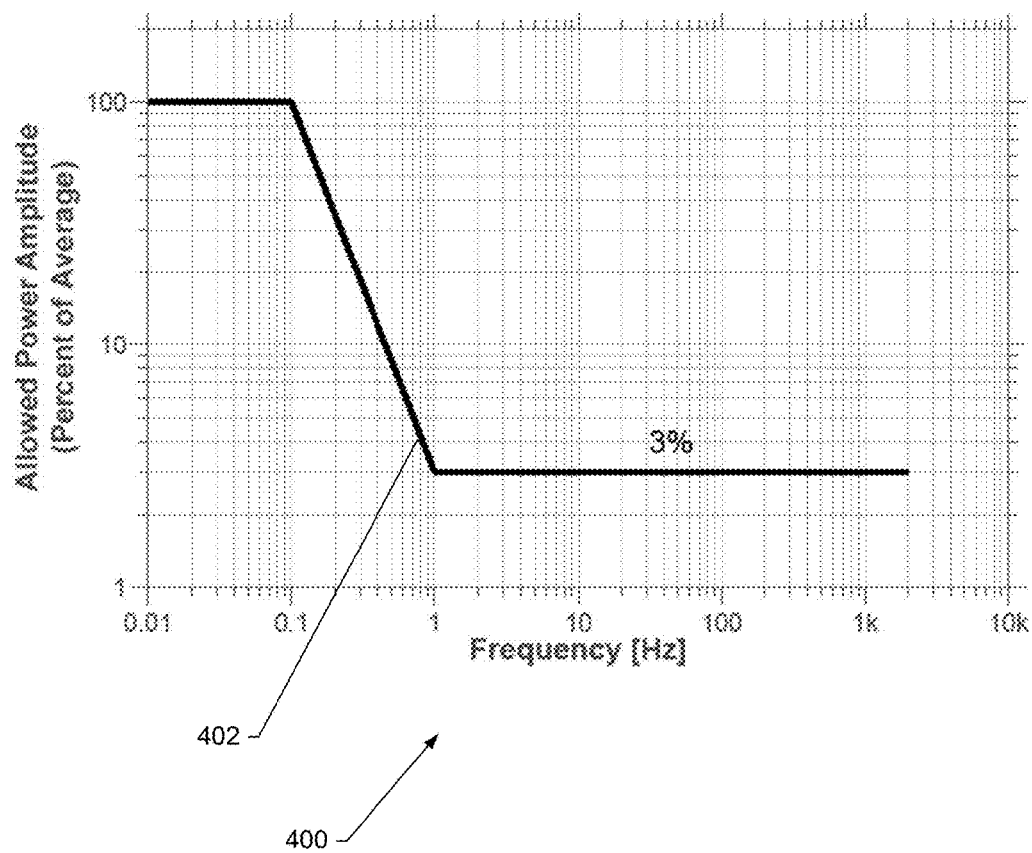
FIG. 2 illustrates an power ripple filtering requirement graph according to an example embodiment.

FIG. 2 illustrates a power ripple filtering requirement graph 400 according to an example embodiment. The power ripple filtering requirement graph 400 may include power ripple limit line 402. In an example embodiment, the combined three phase peak power ripple seen by the generator 102 at any single frequency generated by the dynamic load 108 should be less that than the power ripple limit 402 to maintain compliance with the standard.

The resulting allowed load profile depicted in FIG. 2, e.g. the area under the power ripple limit 402, may be matched to generator 102 and prime mover performance. Typical generator 102 response times to a significant load change are on the order of 1.0 to 1.5 seconds. If power remains constant as seen by the generator 102, the generator 102 and prime-mover control loops may be able to maintain the voltage and speed regulation, bus disturbances may be kept to a minimum or eliminated, and sub-synchronous resonances may not be excited because the disturbances are at lower frequencies than the shaft resonances. Additional losses and bus disturbances due to high harmonic and inter-harmonic noise may also be eliminated. The 3% value for frequencies greater than 1 Hz is chosen in order to be consistent with the existing 60 Hz harmonic line current requirement specified in MIL-STD-1399-680. The corner frequencies in FIG. 2 may be shifted to be consistent with the generator response times. For a slower generator the corner frequencies may be shifted to the left and for a faster generator the corner frequencies may be shifted to the right.

Figure 3:
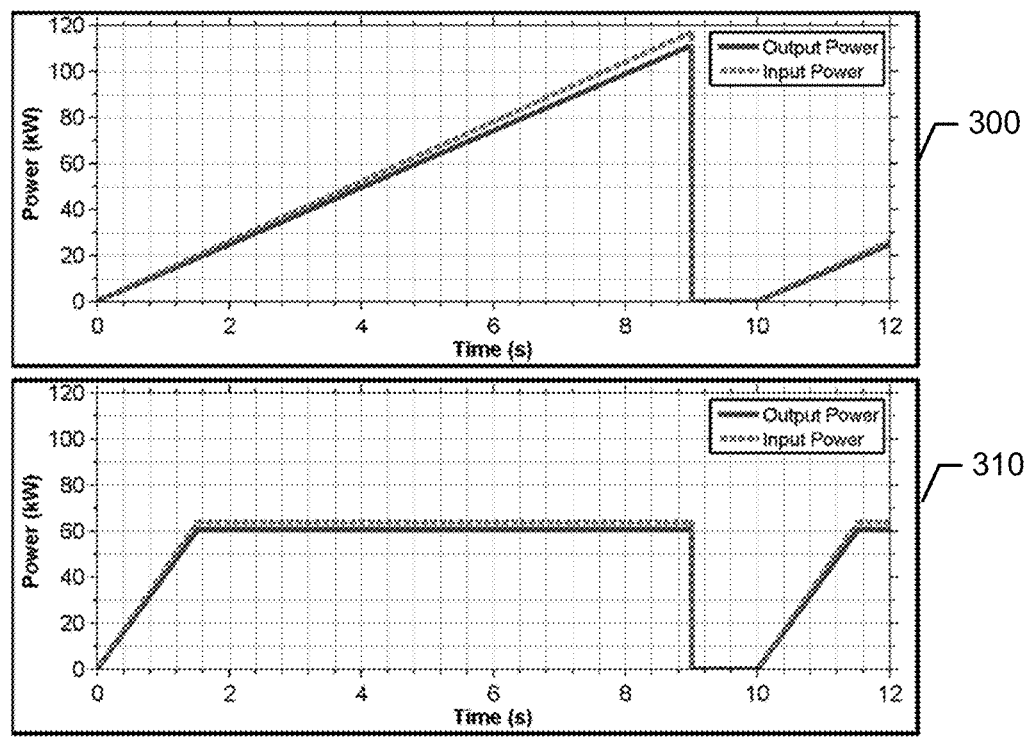
FIG. 3 illustrates load profiles for dynamic loads according to an example embodiment.

With reference to FIG. 3, charts 300 and 310 show example load profiles for an example dynamic, predicable load. The chart 300 provides a graph of a constant current scenario and chart 310 provides a graph of a quasi-constant power scenario. The loads in charts 300 and 310 are the same, but the approach to charging is different with the quasi-constant approach limiting the peak power. As can be seen in the chart 300, over time (e.g., 0 to about 9 seconds) the power increases linearly to about 120 kW at the peak for input power. At about time equals 9 seconds, a discharge event may occur, and the power may rapidly drop to zero. After a short period at zero (e.g., about one-half of a second), the cycle may predictably repeat, and the power may rise again in the same fashion.

With respect to the chart 310, over time (e.g., 0 to about 1.75 seconds) the power increases linearly, i.e., at a more rapid rate that for the constant current scenario. Subsequently, the power flattens to about 62 kW for input power. At about time equals 9 seconds, a discharge event may occur, and the power may rapidly drop to zero. After a short period at zero (e.g., about one-half of a second), the cycle may predictably repeat, and the power may rise again in the same fashion. It is noteworthy that while the load profiles may be different for charts 300 and 310, the area under the curves may be same thereby indicating that the same amount of energy was expended in both scenarios.

As such, with regard to the load profiles shown in charts 300 and 310, it can be seen that the changes in power can be substantial as the load profile repeats. The result may therefore be a pulsating load with a poor peak-to-average power ratio. The poor peak-to-average power ratio may violate the power ripple limit shown in FIG. 2. Further, anomalous behavior may be exhibited by the load.

Figure 4:
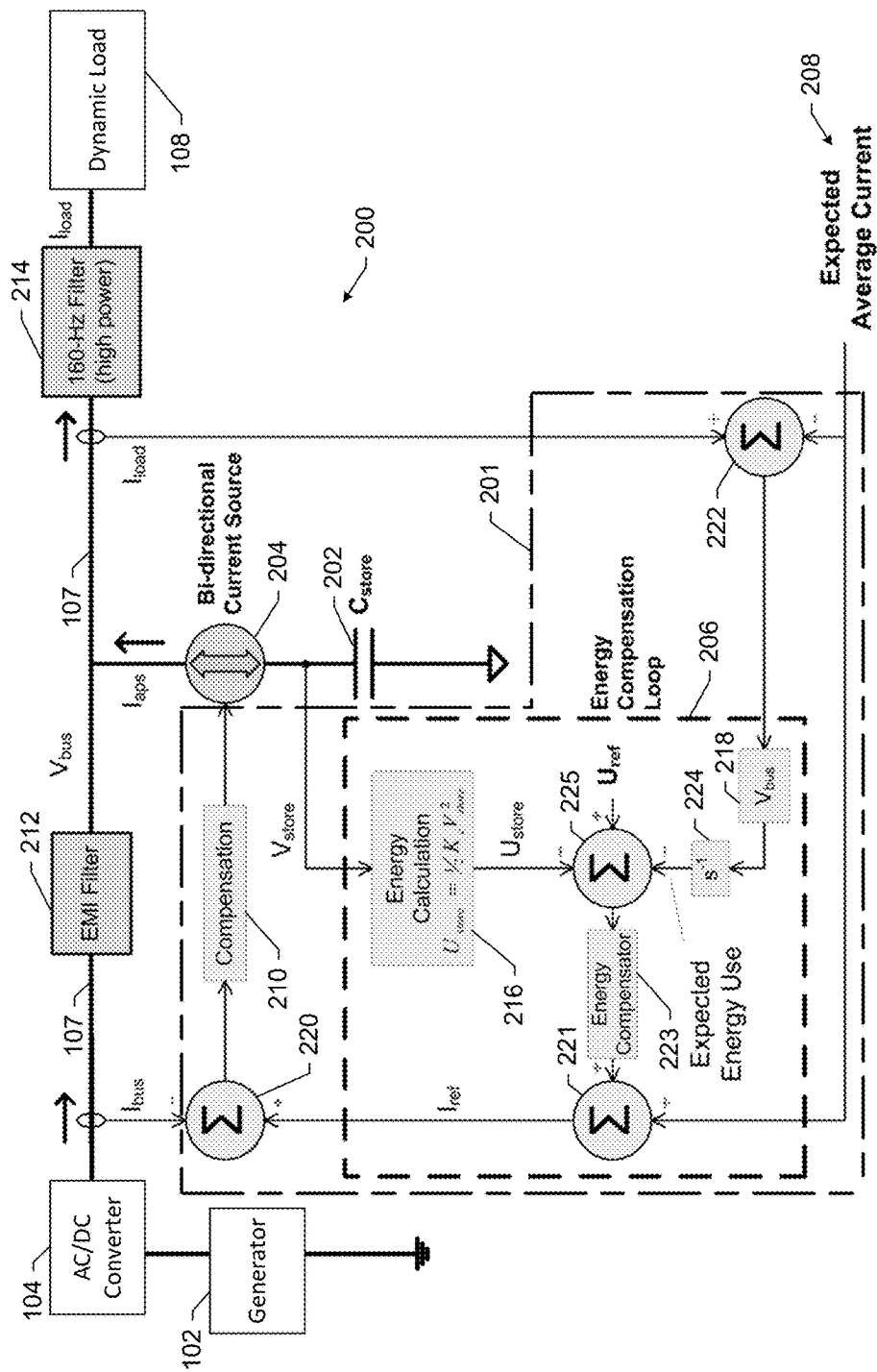
FIG. 4 illustrates functional schematic of the adaptive power system according to an example embodiment.

FIG. 4 illustrates functional schematic of the adaptive power system 200 according to an example embodiment. The adaptive power system 200 may include an energy storage device, such as storage capacitor ($C_{store}$) 202, a bi-directional current source 204, and compensation circuitry 201, which includes energy compensation loop circuitry 206. The input of the expected average current value 208 may be utilized by the compensation circuitry 201 to control the operation of the bi-directional current source 204 and the capacitor 202 to regulate the adaptive power system 200 current output to the DC bus 107 and provide constant power to the DC bus 107, thereby compensating for the dynamic load 108 using the energy from the storage capacitor 202. The energy compensation loop circuitry 206 may be configured to adjust the compensation and maintain a voltage across the storage capacitor 202 within allowable ratings. Although, discussed herein as a storage capacitor 202, the energy storage device may be any suitable energy source, such as a battery, superconducting magnetic energy storage (SMES) devices, super capacitors, or combinations thereof.

In an example embodiment, the adaptive power system 200 may be electrically connected, in shunt, to the DC bus 107. The current supplied by the generator 102, and the AC-DC converter 104 to the DC bus 107 ($I_{bus}$) may be regulated by the adaptive power system 200 to be create a constant power load. In some example embodiments, the compensation circuitry 210 may be configured to regulate $I_{bus}$ to be equal to $I_{ref}$ by monitoring an output of the comparator 220 by controlling the output current ($I_{aps}$) of the bi-directional current source 204. In some example embodiments, the bi-directional current source 204 may be a DC/DC converter that may process power in both directions. In this regard, the bi-directional current source 204 may absorb or deliver power to the DC bus 107 through control of the storage capacitor 202.

In an example embodiment, the AC component or dynamics of the dynamic load profile may be provided by the storage capacitor 202 via the bi-directional current source 204. In an example embodiment, the capacitance value of the storage capacitor 202 may be selected based on being large enough to provide source and sink currents to support the dynamic load profile of the dynamic load 108. The capacitance value of the storage capacitor 202 may be minimized by allowing the voltage across storage capacitor 202 to vary significantly, where $U_{delivered}=1/2C_{store}(V_{t0}^2-V_{t+}^2)$; where $U_{delivered}$ is the energy delivered or absorbed by the storage capacitor 202, and $V_{t0}$ and $V_{t+}$ are the corresponding voltages across the storage capacitor 202 just prior to a load disturbance of the dynamic load profile and after the storage capacitor 202 has delivered or absorbed the desired power. In some example embodiments, minimizing the capacitive value storage capacitor 202 provides significant weight and size savings compared to using an in-line high-powered low-pass filter (e.g., such as with the brute-force method). In some example embodiments, a voltage variation across the storage capacitor 202 may be decoupled from the from the DC bus 107, allowing tight regulation of the DC bus 107 voltage seen by the dynamic load 108 to be maintained. In an example embodiment, a reference current value, $I_{ref}$, may be slowly adjusted, to keep the voltage across the storage capacitor 202 within the allowable boundaries by regulating the energy stored in the storage capacitor 202 via the energy compensation loop 206.

With respect to the operation of the adaptive power system 200, the expected average current value 208 may be an input to the system 200. The expected average current value 208 may be determined based on the dynamic and predictable load profile of the load 108. As such, the expected average current value 208 may take into consideration the current draw over the time needed to, for example, recharge a device such as an electromagnetic railgun device. As such, the expected average current value 208 may be calculated due the load profile of the operating railgun being predictable. Accordingly, the expected average current value 208 may be combined at combiner 221 with an energy compensation loop value provided by energy compensator 223 to generate a reference current value ($I_{ref}$). The reference current value ($I_{ref}$) may be compared to a bus current value ($I_{bus}$) at comparator 220 and the difference may be provided to bi-directional current source 204 as compensation value 210.

With respect to the generation of the energy compensation loop value, the load current ($I_{load}$) may be measured and then compared to the expected average current value 208 at comparator 222. The result may be an indication of the delta current that the adaptive power system 200 may provide to the bus 107 and the result may be multiplied by the bus voltage at multiplier 218 to generate a power value. In this regard, the bus voltage may be simply measured and provided for the multiplication. The power value may be provided to integrator 224 to determine an expected energy use value, which is the expected energy that should be drawn out of the adaptive power system 200. The expected energy use value may then be compared, at comparator 225, to the energy currently stored in the capacitor 202. To do so, the energy stored in the capacitor 202 may be determined using $U_{store}=0.5\,K_cV_{store}^2$, with $V_{store}$ being measured at the capacitor 202 and $K_c$ being the capacitance or capacitance estimate. Therefore, at comparator 225, a reference energy value ($U_{ref}$) may be considered in view of the expected energy use value and the stored energy ($U_{store}$), where the reference energy value ($U_{ref}$) may be the expected average energy associated with the expected average current value 208 and the bus voltage. The result (i.e., the energy compensation loop value) may be forwarded to the energy compensator 223 to be converted, for example, into a current value, for combination at combiner 221 as indicated above. The energy compensation loop value may be close to zero (i.e., a small correction value relative to the expected average current value), and may account for, for example, losses, sensor offsets, and other known errors.

Further, the compensation circuitry 201 may comprise energy compensation loop circuitry 206, which is configured to generate the reference current value ($I_{ref}$) based on the expected average current value 208. The compensation circuitry 201 may further comprise energy compensation loop circuitry 206, where the energy compensation loop circuitry 206 may be configured to generate the reference current value ($I_{ref}$) based on a combination of an energy compensation loop value and the expected average current value 208. The energy compensation loop circuitry 206 may be configured to generate the energy compensation loop value based on an energy storage device value, the expected average current value 208, and a load current value ($I_{load}$). The energy storage device value may be an indication of the quantity of energy stored in the energy storage device ($U_{store}$).

Accordingly, the bi-directional current source 204 may be electrically connected between the energy storage device (e.g., capacitor 202) and a power distribution bus 107 of a power distribution system that include a generator 102 and an AC/DC converter 104. The bi-directional current source 204 may be configured to receive the compensation value from compensation circuitry 201 and, based on the compensation value, maintain a constant power level on the power distribution bus 107 by delivering current to the power distribution bus from the energy storage device or absorbing current from the power distribution bus for storage in the energy storage device. The compensation circuitry 201 may be configured to generate the compensation value 210. The expected average current value 208 for the dynamically changing load and a power distribution bus current value (hoax) may be used to generate the compensation value 210 for maintaining the constant power level on the power distribution bus 107. The compensation circuitry 201, which may be comprised of operational amplifiers, transistors, software and firmware executing digital controllers or computers, and the like, may be configured to generate a difference between a reference current value ($I_{ref}$) and the power distribution bus current value ($I_{bus}$), where the difference may be used to generate the compensation value 210.

According to some example embodiments, the compensation circuitry 210 may be physically embodied in a variety of ways. For example, the compensation circuitry 210 may be comprised of an assembly of operational amplifiers, transistors, and other passive components configured to perform the operations described herein. Alternatively, some or all of the functionality of the compensation circuitry 210 may be performed by a programmed field programmable gate array (FPGA) or an application specific integrated circuit (ASIC). Still, according to some example embodiments, processing circuitry including a processor and a memory may be used to implement some or all of the functionality of the compensation circuitry 210 described herein. In this regard, the processing circuitry may be hardware or software configured to perform the functionalities described herein.

In an example embodiment, a low-pass filter 214 may be disposed between the adaptive power system 200 and the dynamic load 108, or between the power distribution system and the adaptive power system 200, to limit the bandwidth requirement of the adaptive power system 200. The low-pass filter 214 may reduce the response-time requirement of the adaptive power system 200 by reducing the high-frequency components of dynamic load profile seen at the DC bus 107 connection to the bi-directional current source 204. The corner frequency for the low-pass filter 214 depicted in the present example is approximately 160 Hz.

As discussed, the adaptive power system 200 may absorb or deliver, e.g. sink and source, current through the bi-directional current source 204, to compensate for the dynamic load profile. The bi-directional current source 204 may be any appropriate bi-directional current source topology, such as a bi-directional buck topology. Because the power for compensating for the dynamic load profile is not provided by the generator 102, the capacitance value of the storage capacitor 202 may be selected to be large enough to provide the source and sink currents to support the dynamic load profile demand, while concurrently maintaining the voltage across the storage capacitor 202 within the defined allowable range.

In an example embodiment, the voltage range of the storage capacitor 202 may be indirectly controlled by regulating the energy stored in the storage capacitor 202. The reference current ($I_{ref}$) may be slowly adjusted to maintain the proper energy storage, thus keeping the proper voltage range across storage capacitor 202. Energy regulation may be chosen over voltage regulation to linearize the outer loop transfer function with respect to the output current controlled by the bi-directional current source 204. Energy regulation may reduce or eliminate the dependency on the duty cycle of the bi-directional current source 204. The duty cycle of the bi-directional current source 204 may vary with the voltage across storage capacitor 202 and, the bandwidth may remain constant as the voltage across storage capacitor 202 changes, because the transfer function $U_{delivered(s)}/I_{aps(s)}$ may be independent of the voltage across storage capacitor 202.

In some example embodiments, the adaptive power system 200 may also include an electromagnetic interference (EMI) filter 212. The EMI filter 212 may be configured to reduce or eliminate EMI produced by the adaptive power system 200 and/or the dynamic load 108. In an example embodiment, the EMI filter 212 may be disposed in between the generator 102 and the dynamic load 108. In some instances, the EMI filter 212 may be disposed inline with the bi-directional current source 204.

Figure 5:
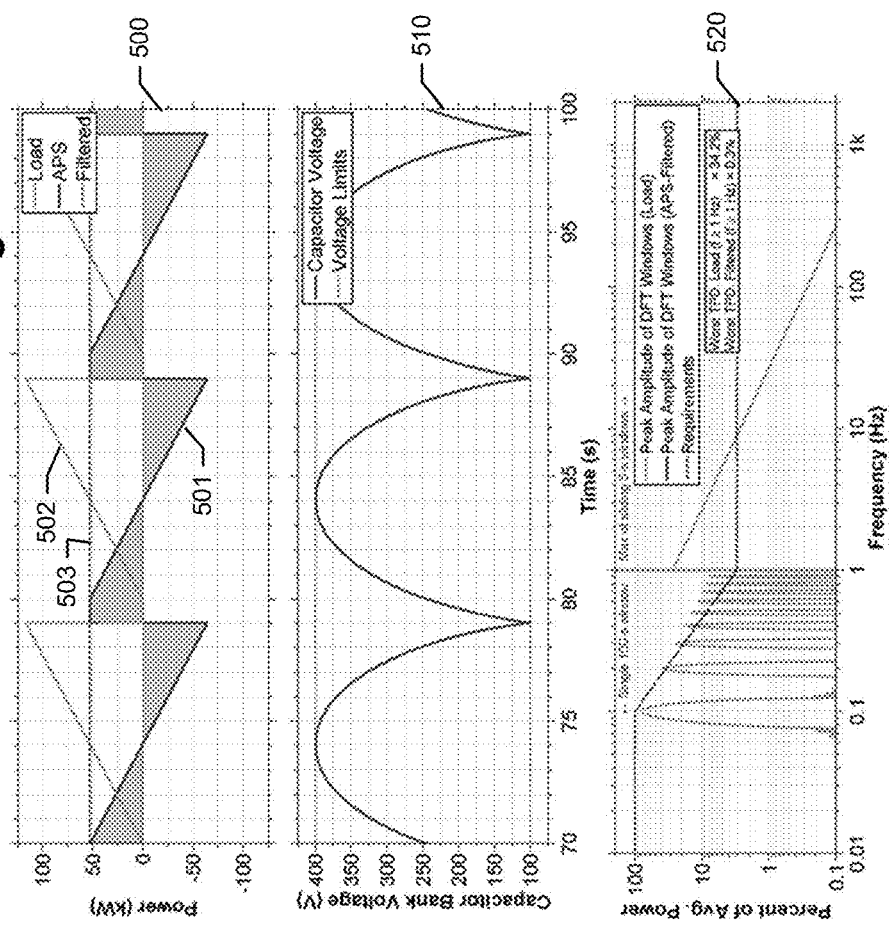
FIGS. 5 and 6 are charts of various operational parameters of the adaptive power system according to an example embodiment.

With reference to FIG. 5, charts 500, 510, and 520 are provided showing the operation of the example adaptive power system 200 when operating in a constant current charger scenario. In this regard, with reference to chart 500, power versus time is shown. The load is shown at 502. The contribution of the adaptive power system 200 is shown at 501. It can be seen that when the load is below the constant power 503, the adaptive power system 200 absorbs power to maintain the 50 kW constant power. However, when the load is above the constant power 503, the adaptive power system 200 injects or delivers power to maintain the 50 kW constant power. Additionally, as shown in chart 510, which is on the same time axis, the voltage across the capacitor may fluctuate completely between the voltage limits during the charge and discharge cycles, which can be seen in relation to the adaptive power system contribution 501 of chart 500. Finally, as shown in chart 520, the harmonics and noise associated with the load are eliminated from the systems (i.e., the result is below the lower limits of the graph) and therefore the power ripple filtering requirement is met.

Figure 6:
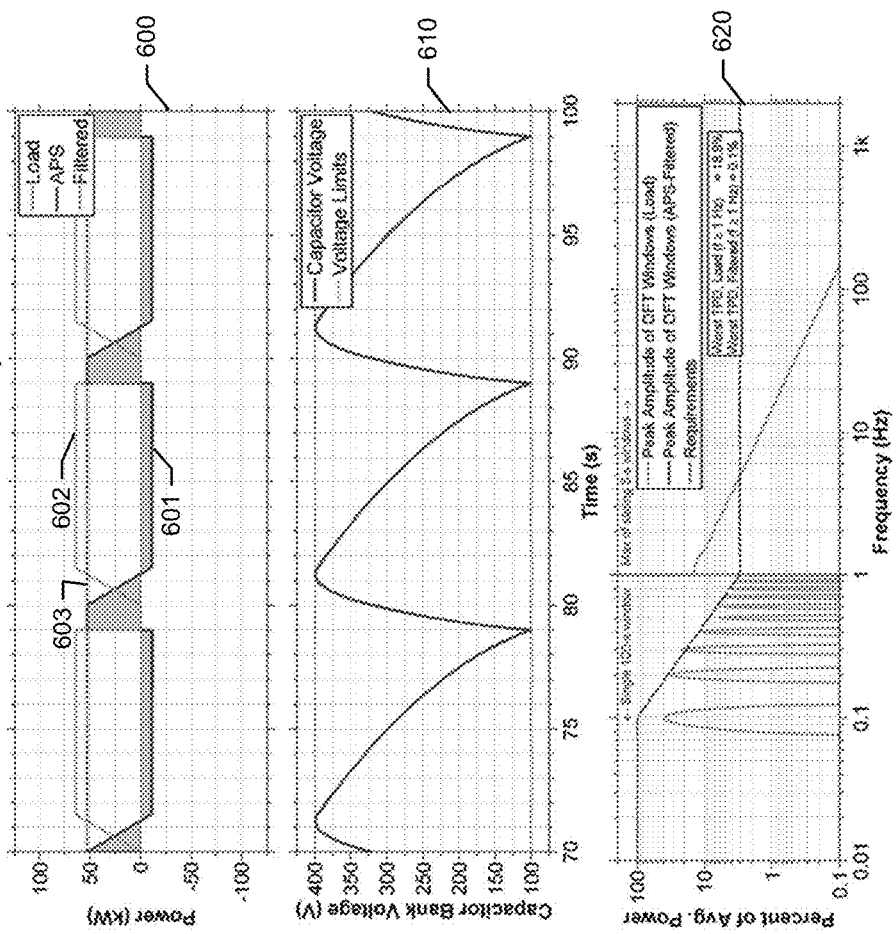

With reference to FIG. 6, charts 600, 610, and 620 are provided showing the operation of the example adaptive power system 200 when operating in a quasi-constant power scenario. In this regard, with reference to chart 600, power versus time is shown. The load is shown at 602. The contribution of the adaptive power system 200 is shown at 601. It can be seen that when the load is below the constant power 603, the adaptive power system 200 absorbs power to maintain the 50 kW constant power. However, when the load is above the constant power 603, the adaptive power system 200 injects or delivers power to maintain the 50 kW constant power. Additionally, as shown in chart 610, which is on the same time axis, the voltage across the capacitor may fluctuate completely between the voltage limits during the charge and discharge cycles, which can be seen in relation to the adaptive power system contribution 601 of chart 600. Finally, as shown in chart 620, the harmonics and noise associated with the load are eliminated from the systems (i.e., the result is below the lower limits of the graph) and therefore the power ripple filtering requirement is met.

Figure 7:
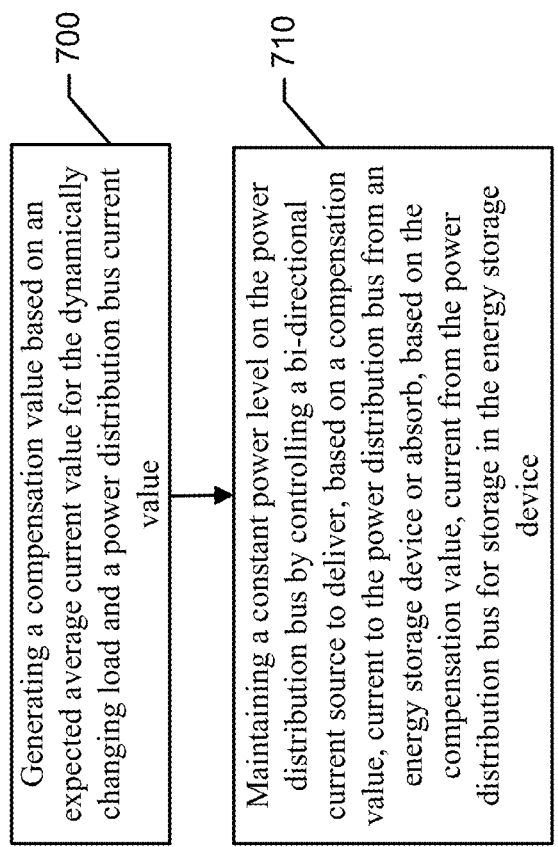
FIG. 7 illustrates a flowchart of an example method according to an example embodiment.

Now with reference to FIG. 7, a flowchart of an example method for powering a dynamically changing load is provided. The example method may include, at 700, generating a compensation value based on an expected average current value for the dynamically changing load and a power distribution bus current value. The example method may further include, at 710, maintaining a constant power level on the power distribution bus by controlling a bi-directional current source to deliver, based on a compensation value, current to the power distribution bus from an energy storage device or absorb, based on the compensation value, current from the power distribution bus for storage in the energy storage device. According to some example embodiments, the example method may further include generating a difference between a reference current value and the power distribution bus current value. In this regard, the difference may be used to generate the compensation value. Further, according to some example embodiments, the example method may further include generating the reference current value based on the expected average current value. According to some example embodiments, the example method may further include generating the reference current value based on a combination of an energy compensation loop value and the expected average current value. According to some example embodiments, the example method may further include generating the energy compensation loop value based on an energy storage device value, the expected average current value, and a load current value, where the energy storage device value is an indication of the quantity of energy stored in the energy storage device. Additionally, according to some example embodiments, the example method may include the energy storage device being a storage capacitor, a battery, a super capacitor, or super conducting magnetic energy storage.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An adaptive power system for powering a dynamically changing load, the adaptive power system comprising:
   an energy storage device;
   a bi-directional current source configured to be electrically connected between the energy storage device and a power distribution bus of a power distribution system, wherein the bi-directional current source is configured to receive a compensation value and, based on the compensation value, maintain a constant power level on the power distribution bus by delivering current to the power distribution bus from the energy storage device or absorbing current from the power distribution bus for storage in the energy storage device; and
   compensation circuitry including energy compensation loop circuitry and configured to generate the compensation value,
   wherein an expected average current value for the dynamically changing load and a power distribution bus current value are used to generate the compensation value for maintaining the constant power level on the power distribution bus,
   wherein the compensation circuitry is further configured to generate a difference between a reference current value and the power distribution bus current value, the difference being used to generate the compensation value, and
   wherein the energy compensation loop circuitry of the compensation circuitry is configured to generate the reference current value based on the expected average current value.

2. The adaptive power system of claim 1, wherein the energy compensation loop circuitry of the compensation circuitry is further configured to generate the reference current value based on a combination of an energy compensation loop value and the expected average current value.

3. The adaptive power system of claim 2, wherein the energy compensation loop circuitry is configured to generate the energy compensation loop value based on an energy storage device value, the expected average current value, and a load current value; wherein the energy storage device value is an indication of the quantity of energy stored in the energy storage device.

4. The adaptive power system of claim 1, wherein the energy storage device comprises a storage capacitor, a battery, a super capacitor, or super conducting magnetic energy storage.

5. The adaptive power system of claim 1 further comprising an electromagnetic interference filter disposed between the power distribution system and the dynamic load.

6. An adaptive power system for powering a dynamically changing load, the adaptive power system comprising:
   an alternating current (AC) generator;
   an AC to direct current (DC) converter coupled between the generator and the dynamically changing load;
   an energy storage device;
   a bi-directional current source configured to be electrically connected between the energy storage device and a power distribution bus of a power distribution system, wherein the bi-directional current source is configured to receive a compensation value and, based on the compensation value, maintain a constant power level on the power distribution bus by delivering current to the power distribution bus from the energy storage device or absorbing current from the power distribution bus for storage in the energy storage device; and
   compensation circuitry including energy compensation loop circuitry and configured to generate the compensation value,
   wherein an expected average current value for the dynamically changing load and a power distribution bus current value are used to generate the compensation value for maintaining the constant power level on the distribution bus, wherein the compensation circuitry is further configured to generate a difference between a reference current value and the power distribution bus current value, the difference being used to generate the compensation value, and wherein the energy compensation loop circuitry of the compensation circuitry is configured to generate the reference current value based on the expected average current value.

7. The adaptive power system of claim 6, wherein the energy compensation loop circuitry of the compensation circuitry is further configured to generate the reference current value based on a combination of an energy compensation loop value and the expected average current value.

8. The adaptive power system of claim 7, wherein the energy compensation loop circuitry is configured to generate the energy compensation loop value based on an energy storage device value, the expected average current value, and a load current value; wherein the energy storage device value is an indication of the quantity of energy stored in the energy storage device.

9. The adaptive power system of claim 6, wherein the energy storage device comprises a storage capacitor, a battery, a super capacitor, or super conducting magnetic energy storage.

10. The adaptive power system of claim 6 further comprising an electromagnetic interference filter disposed between the power distribution system and the dynamic load.

11. A method for powering a dynamically changing load, the method comprising:

generating a reference current value based on a combination of an energy compensation loop value and an expected average current value;

generating a difference between the reference current value and a power distribution bus current value;

generating a compensation value based on the expected average current value for the dynamically changing load and the difference between the reference current value and the power distribution bus current value; and maintaining a constant power level on the power distribution bus by controlling a bi-directional current source to deliver, based on the compensation value, current to the power distribution bus from an energy storage device or absorb, based on the compensation value, current from the power distribution bus for storage in the energy storage device.

12. The method of claim 11 further comprising generating the energy compensation loop value based on an energy storage device value, the expected average current value, and a load current value; wherein the energy storage device value is an indication of the quantity of energy stored in the energy storage device.

13. The method of claim 11 wherein the energy storage device comprises a storage capacitor, a battery, a super capacitor, or super conducting magnetic energy storage.

\* \* \* \* \*